United States Patent [19]

Görling et al.

[11] 4,069,041

[45] Jan. 17, 1978

[54] METHOD OF RECOVERING NON-FERROUS METALS FROM SULPHIDIC MATERIALS

[75] Inventors: Karl Göran Görling, Lidingo; Ingvar A. O. Edenwall, Helsingborg; Jan-Olof Jansson; Thomas K. Miöen, both of Stockholm, all of Sweden

[73] Assignee: Boliden Aktiebolag, Stockholm, Sweden

[21] Appl. No.: 699,323

[22] Filed: June 24, 1976

[30] Foreign Application Priority Data

July 1, 1975 Sweden ................................ 7507507

[51] Int. Cl.² .............................................. C22B 15/00
[52] U.S. Cl. ...................................... 75/101 R; 75/7; 75/60; 75/116; 75/117; 204/108
[58] Field of Search ................. 75/101 R, 117, 7, 116, 75/60; 204/108

[56] References Cited

U.S. PATENT DOCUMENTS

| 839,451 | 12/1906 | Blackmore et al. ............... 75/116 X |
|---|---|---|
| 1,974,886 | 9/1934 | Young ................................. 75/116 X |
| 2,783,141 | 2/1957 | Foley ....................................... 75/26 |
| 3,971,652 | 7/1976 | Bryson ............................... 75/117 X |

*Primary Examiner*—G. Ozaki
*Attorney, Agent, or Firm*—Stevens, Davis, Miller & Mosher

[57] ABSTRACT

A method for recovering copper and/or other non-ferrous metals from sulphidic raw material by roasting the material to a substantially sulphur-free state and then in a separate furnace sulphatize the roasted material into a form of a readily soluble sulphate and/or basic sulphate and then leaching the sulphatized material with an aqueous sulphuric acid solution. Copper and/or other non-ferrous metals are recovered from the spent leaching solution. The leaching solution is after said recovering recirculated to the leaching stage and to the roasting stage.

19 Claims, 1 Drawing Figure

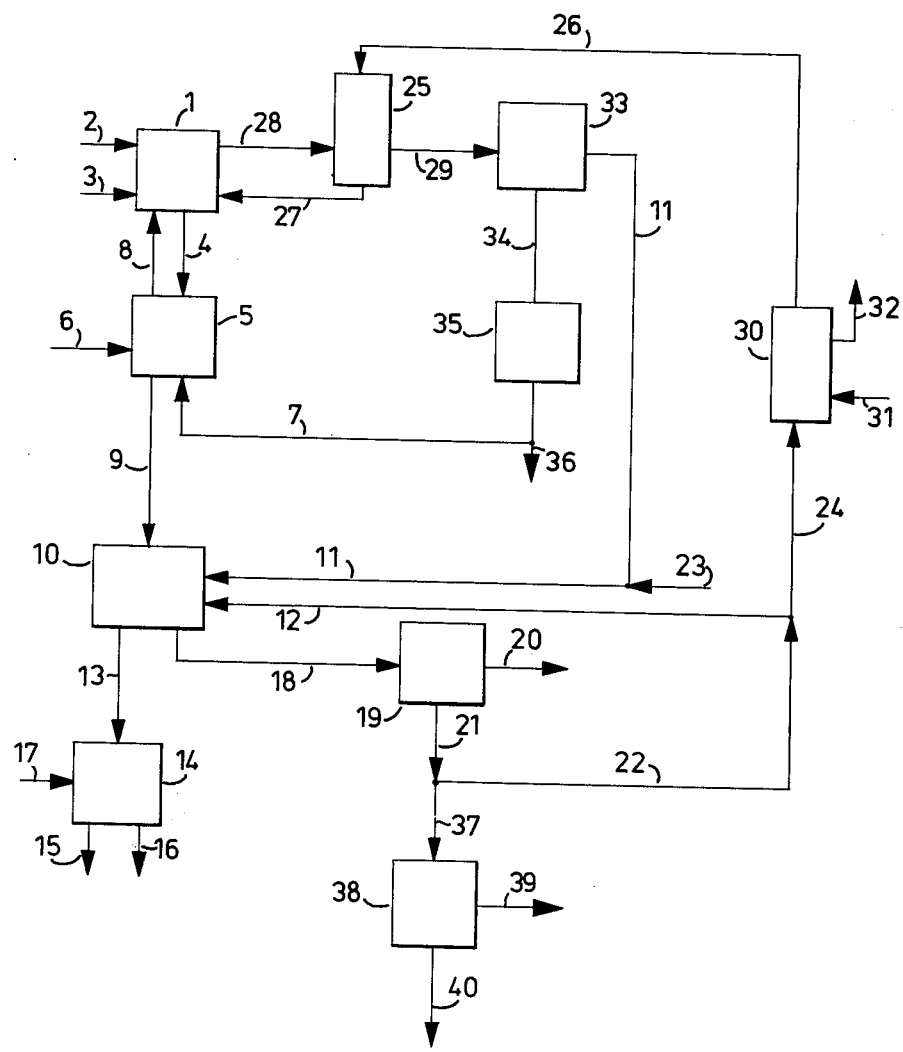

METHOD OF RECOVERING NON-FERROUS METALS FROM SULPHIDIC MATERIALS

The present invention concerns a method for recovering copper and/or other non-ferrous metals from sulphidic raw materials by a sulphatizing and leaching process.

Sulphidic materials containing copper are normally worked-up by pyrometallurgical processes. With such processes, the iron content of the material, which is normally relatively high, can not be utilized economically and present day requirements with respect to low energy consumption and environmental protection are difficult to fulfil.

Hitherto, it has not been possible to practice purely hydrometallurgical processes suitable for recovering copper directly from sulphidic raw material on an economic basis, owing to the difficulties encountered when leaching sulphides and to the fact that valuable secondary products cannot readily be effectively recovered.

Metals contained in for instance, copper ore can be recovered hydrometallurgically by first converting the copper sulphide and other non-ferrous metal sulphides present in the raw material to sulphate or basic sulphates (MeO . yMeSO$_4$) whilst simultaneously oxidizing the iron. The first tests to be carried out with the view of developing such a process were made by Bagdad Copper Corp USA (American Electrochem. Soc. June 1930), although it was not possible in practice to solve the problem of controlling the iron-sulphatizing reactions. With the development of the fluidized-bed technique for roasting purposes it became possible to control the process during roasting in a manner, so as to avoid sulphatizing the iron. One such process, the so-called RLE-process, was developed around 1957 (U.S. Pat. No. 2,783,141). In this case, the copper-containing material was roasted in a fluidized-bed furnace of the Dorr-Oliver-type (Fluo-Solid ®-furnace) in a manner such that copper and other non-ferrous metals were sulphatized whilst the iron was oxidized to hematite (Fe$_2$O$_3$). It was necessary to accurately control the temperature in order to prevent the iron from sulphatizing at the same time. With too low temperature, iron sulphates were formed, whilst at too high temperatures copper and other non-ferrous metals react with the hematite to form ferrites, which are not readily dissolved and consequently negatively affect the process yield. The roasted product is then leached in a sulphuric acid solution obtained from the terminal electrolysis stage, and copper is recovered from the leaching solution electrolytically in a process which uses nonconsumable anodes and copper cathodes, the sulphuric acid being regenerated at the same time. This latter process is normally being referred to as electrowinning. The process, however, exhibits a number of disadvantages and limitations which affect its economy and untility. Thus, the yield of copper is lower than that with known pyrometallurgical processes and, further more, the precious metal content of the material is lost in the leaching residue, which can not be used. However, the most serious disadvantage perhaps is the harmful effect which this residue has on the environment since the amount of acid formed during the electrolysis is in excess of that required for the leaching process, and hence a large quantity of copper-containing acid solution is released to the recipient. A development and improvement of the RLE-process has been described by Hecla Mining Comp. USA (Engn. Min. Journ. Aug. 1973 and AIME-TMS paper, No. A73-64, 1973), in which, inter alia, the aforementioned problem concerning the excessive sulphuric acid formed is solved by using the sulphuric acid for leaching oxidic copper ore in a separate process, wherein copper can be recovered from the solution obtained from the oxide-leaching process by cementing with sponge iron which, in turn, is obtained by reducing leaching residues obtained from the RLE-leaching step.

In this way it is possible to obtain a higher copper yield than that obtained with the previous RLE-process, although a number of serious disadvantages are still encountered. During the cementing process, a major portion of the iron is converted to iron sulphate, which can not be worked-up economically, and hence large quantities of iron sulphate solution obtained from the cementing process must be released to a recipient. As previously mentioned, the roasting temperature must be accurately controlled, as must also the ratio between the sulphide and the air supplied to the system during the roasting process. Consequently, it is normally not possible to avoid sulphatizing the iron present, and hence approximately 10% of the input iron is leached out, the leaching yield in respect of copper from the sulphidic raw material to electrolyte being around 95–99%.

The roaster gases obtained from the fluidized-bed furnace contain only 6–8% SO$_2$, which content can only be increased by using additional oxygen gas at the roasting operation. A partial roasting process, i.e. a process in which an insufficient quantity of air is supplied so that the roasted product is only partially oxidized and sulphatized and thus contains substantial sulphide residues, is also conceivable and has been tested, although the leaching process in this case is complicated and must be carried out at a raised pressure in an autoclave, in order that the sulphides are able to react. Such a process is also encumbered with serious corrosion problems.

Consequently, attempts have been made to recover copper from chalcopyrite by partially roasting the chalcopyrite, to form bornite and iron sulphide whereafter the iron which is present is leached out with diluted hydrochloric acid and the sulphide leach-residues are dissolved to form an electrolyte, from which copper is recovered by electrowinning (U.S. Pat. No. 3,857,767).

Attempts which have been made to avoid some of the problems occurring during a sulphatizing roasting process have been described, for example, in the German Offenlegungsschrift No. 2,146,334, which discloses a method for the sulphatizing- roasting of ores which are rich in iron and which contain non-ferrous metals, using a roasting gas containing SO$_3$, SO$_2$, O$_2$ in a circulatory system, the partial pressure of sulphur trioxide being controlled so that iron sulphate is stable at the reaction temperature, whilst sulphates of non-ferrous metals decompose. It is disclosed in the German Offenlegungsschrrift No. 2,214,688 that gaseous sulphatizing agents are formed directly in the reaction chamber during the roasting operation, by adding sulphur, sulphur-containing ores or splittable sulphates, such as iron(II)sulphate, at the prevailing conditions. In accordance with another method described in the German Offenlegungsschrift No. 2,102,576, the iron and non-ferrous metals present are completely sulphatized, whereafter the sulphates are leached out in an aqueous solution and non-ferrous metals present are recovered from the leaching solution. The leaching solution thereafter contains iron sulphate and constitutes a waste product. Hashett et al (Bureau of Mines Technical Progress Report —67 March 1973) describes a method in which the sulphatizing process can be made more effective by adding hematite ($Fe_2O_3$) to sulphidic raw material prior to a roasting operation, this being due to the fact that hematite catalyses the reaction, resulting in the formation of sulphur trioxide ($SO_3$). Thus, when using relatively large additions of hematite, the non-desirable formation of ferrites can be reduced at roasting temperature between 400° and 600° C.

The working-up of sulphatized copper by hydrometallurgical methods results in the formation of a surplus quantity of diluted sulphuric acid in the leaching systems. This acid must be destroyed which, as described above, can be effected by leaching oxidic-copper ore, when such is available (the RLE-process, Hecla Mining Comp. USA) or by neutralizing the acid such as in accordance with the so-called Dowa Mining process (Journal of Metals, page 634 (1955)), in which method a copper-zinc-iron-concentrate is roasted and sulphatized in a fluidized-bed furnace of the Dorr-Oliver-type. The sulphates in the roasted product are leached out and the leaching solution is electrolyzed to recover copper. The residual solution, which contains diluted sulphuric acid, is neutralized with limestone and the gypsum thus formed (hydrated calcium sulphate) constitutes a waste product. Thus, in these processes a large portion of the input quantity of sulphur constitutes a waste product. Since only a few copper plants have natural access to oxidic-copper ores, and because of the problems caused with respect to sulphur losses, emission and waste, a modified technique for this kind of hydrometallurgical treatment of sulphidic copper raw material must be developed.

To enable the sulphur content of the material to be recovered, the roasting process must be effected in a manner such that the $SO_2$-content of the roaster gas is sufficiently high for the gas to be used for the manufacture of sulphuric acid or elementary sulphur. When the roasting process has the form of a dead-roasting process and is effected at approximately 800° C, wherewith the iron is completely converted to hematite, the major portion of the copper present will be bound as copper ferrite and there is simultaneously obtained a roaster gas having at most approximately 12–14% $SO_2$. By reducing such a roasted product in a separate stage copper ferrites can be split-off and converted to metallic copper and iron oxides. The reduced roasted product can then be leached with ammonium-hydroxide so as to dissolve the copper content. A complicated process is then required for recovering the copper from a sulphate solution by electrolyses, electrowinning, this process comprising, inter alia, the liquid-liquid extraction of the leaching solution. This process has been developed by the Bureau of Mines (U.S. Bureau of Mines Report of Investigation 7996, 1975) and the copper yield is said to be 97.4%.

It has now surprisingly been discovered that the RLE-process can be modified so that all the disadvantages associated therewith can be eliminated whilst simultaneously obviating the necessity of introducing complicated process steps such as the splitting-off of ferrites in separate reduction steps and the alkaline leaching of the roasted product with ammonium hydroxide with subsequent extraction and sulphatizing, such complicated process steps being part of the aforementioned process developed by the U.S. Bureau of Mines.

The invention thus is a method for recovering copper and/or other non-ferrous metals including precious metals, from sulphidic raw material, wherein the starting material is first subjected to a sulphatizing treatment so as to convert at least one of the non-ferrous metals into the form of a readily soluble sulphate and/or basic sulphate, whereafter said at least one non-ferrous metal in a leaching stage is leached out with an aqueous sulphuric acid solution, the major quantity of the leached metal or metals then being recovered from the leaching solution formed and wherein remaining non-ferrous metals in the leaching residue formed is optionally recovered by further process stages, characterized in that the sulphatizing treatment process is carried out in two stages, the material being in a first stage roasted in a roasting furnace to a substantially sulphur-free state and then in a second stage the roasted material being treated in a separate reaction chamber by supplying sulphatizing agent thereto, the second stage treatment being effected under such conditions as to permit substantial forming of compounds comprising sulphates, basic sulphates or mixtures thereof of said at least one non-ferrous metal, that a first portion of the residual solution obtained subsequent to recovering non-ferrous metal content from the leaching solution is fed to the leaching stage, the magnitude of said first portion being selected to effect said leaching and that a second portion of said residual solution is returned to the roasting furnace, where the sulphur content of said second portion of the solution is converted into sulphur dioxide and passed to the gases formed by the roasting.

Thus, instead of being effected in one step, the sulphatizing roasting process according to the present invention is effected in two steps, substantially in accordance with Canadian Pat. No. 892,475, hereby incorporated by reference, where the stability of different metal sulphates are discussed. The conditions for formation of sulphates and basic sulphates of iron and non-ferrous metals can be thermodynamically calculated from data given in e.g. Kellogg, Trans AIME 230:1622–1634 (1964) and ANAF Thermochemical Tables 1965–68. The roasting of the ore to a substantially sulphur-free material in the first step may advantageously be effected in a way that any iron present in the roasted material is at least partly in the form of magnetite. This can be effected by carrying out the roasting in the first stage at a temperature of between 800° and 1100° whilst supplying a gas containing free oxygen in a manner such that the partial pressure of oxygen in the resulting roaster gas lies beneath a curve which is formed in a diagram where $\log_{10} P_{O_2}$ is plotted on the ordinate and where $p$ is expressed in atmospheres and the temperature is plotted on the abscissa in °C, said curve passing the associated values:

| $\log_{10} p_{O_2}$ | Temp. ° C |
|---|---|
| −6.6 | 800 |
| −4.5 | 900 |
| −3.0 | 1000 |
| −2.3 | 1050 |

If a material where the iron content is substantially in the form of magnetite is desired the roasting can be effected by setting the partial pressure of oxygen in the resulting roaster gas so that the pressure lies beneath a curve in said diagram which passes through the points:

| $\log_{10}p_{O_2}$ | Temp. ° C |
|---|---|
| −9.5 | 800 |
| −7.5 | 900 |
| −5.8 | 1000 |
| −5.0 | 1050 |

The roasted material is then in the second step sulphatized with a sulphatizing agent in a separate reaction chamber. The roasting process thus can be carried out at considerably higher temperatures than when roasting and sulphatizing is effected in a single step. This provides a roaster gas having the desired high $SO_2$-content and low $SO_3$-content. Furthermore, the formation of non-ferrous metal ferrites may be avoided, provided no hematite is present in the roasted material. In the subsequent sulphatizing stage, the temperature is maintained at such a low magnitude that, despite the strongly oxidizing conditions, no ferrites can form. A high content of $SO_3$ can be maintained in the separate sulphatizing step, which also suppresses the formation of ferrite. The leachability in respect of copper in a magnetitc roasted material subsequent to sulphatizing is also very high owing to the absence of ferrites. Leaching tests carried out on sulphatized products which have been prior roasted with different quantities of air showed an optimal leachability at roasting with a quantity of air approximately 98% of the stoichiometrically calculated quantity of air required for roasting to magnetite.

The sulphatizing treatment may be effected so that the treated product contains the non-ferrous metals in the form of sulphates, basic sulphates or mixtures thereof. The expression "basic sulphate" is intended to represent salts and mixtures with the general formula $xMeSO_4 \cdot yMeO$ which is known to define basic sulphates. Mixtures of different sulphates and oxides are also included. The sulphatizing agent supplied to the sulphatizing stage may comprise at least one of the agents in the group consisting of sulphuric acid, sulphur dioxide and air, or sulphur trioxide.

A further essential advantage with the process according to the invention is that the residual sulphuric acid containing solution, i.e. the entire leaching solution which is left after recovering the major portion of the non-ferrous metal content thereof can be made use of and utilized partly as recycled leaching solution and partly be returned to the roasting furnace, in which the sulphuric acid is split-off and reduced to $SO_2$, which further enriches the roaster gas so that contents of up to 21% by volume $SO_2$ can be obtained. The iron content in the raw material can be recovered in the form of purified iron oxide and since no iron is dissolved during the process, no chemicals need be consumed to precipitate iron. The roasting stage is effected at such conditions that no iron sulphates can exist. The entire sulphur content of the raw material can be converted to a single collected gas, which can be conveniently recovered since the sulphur-rich gas is particularly suitable for producing liquid $SO_2$, sulphuric acid or elementary sulphur.

In a preferred embodiment of the method according to the invention the residual sulphuric acid solution is passed to a separate evaporator in direct connection with the roasting furnace to increase the sulphuric acid concentration in the part of the solution returned to the roasting stage. Said returned sulphuric acid containing solution is preferably also evaporated by direct heat exchanging with the roaster gases before it is passed to the roasting furnace. To prevent nickel enrichment in the process when nickel is present in the raw material a part of the residual solution can be drawn-off and enriched by evaporation, whereby nickel sulphate precipitates before passing the solution to the roasting furnace. The non-ferrous metals can be recovered from the leaching solution by reduction of said non-ferrous metals, said reduction may preferably be effected by electrolysis. Prior to the recovery of non-ferrous metals the leaching solution may be purified from any non-desirable metals, such as iron, e.g. by liquid-liquid extraction.

Another preferred embodiment according to the present invention, where the leaching solution will contain higher amounts of iron and arsenic, antimony and/or bismuth is to purify the leaching solution before electrolysis by precipitation. It is normally necessary to keep the iron content below 2 g/l Fe and also to control the antimony and bismuth content in the electrolyte to facilitate the electrowinning by electrolysis of for example the copper content in the leaching solution. Such a purifying operation can be made by bulk precipitation of iron as an iron(III)hydroxide product preferably at a pH above 4 or higher. Arsenic, antimony and bismuth is adsorbed on the iron hydroxide precipitate or is coprecipitated as iron(III)arsenate or the like. If the leaching stage according to this invention is carried out as a counter current multistep leveling operation it is possible to obtain a leaching solution with low acid content which makes the demand for neutralization agent supply prior to said precipitation low. As neutralization agent is preferably used lime stone, lime slurry or zinc oxide.

The leaching residue is discharged or further treated in additional process steps to recover other valuable non-leached elements. Thus remaining non-ferrous metals may be recovered by a chlorinating treatment of the residue or by leaching the residue with a solution containing chlorine or cyanide. A leaching with cyanides is a preferred method especially when the raw material contains valuable precious metals.

It can further be emphasized that the process according to this invention gives hardly no waste products as slags, leaching residues, spent electrolytes, gypsum, etc. and thus makes it possible to locate plants also on places where no acceptable recipients for waste materials are available.

To enable the invention to be more readily understood, an embodiment of the invention together with a certain process step connected therewith will now be described with reference to the enclosed drawing, which is a flow-sheet illustrating the recovering of copper from sulphidic copper ore.

As will be seen from the single figure of the drawing, sulphidic copper ore concentrates are charged to a roasting furnace 1 through a line 2 and air is charged to the furnace 1 through a line 3. The copper concentrates are roasted in the furnace at a temperature of approximately 900° C whereafter the roasted product is transferred, via a line 4, to a further furnace 5, to which air is supplied through a line 6 and sulphuric acid through a line 7. The product is sulphatized in the furnace 5 at a temperature of approximately 700° C. The roaster gas is transferred from the furnace 5 to the furnace 1 via a line 8. The sulphatized material is transferred from the furnace 5, via a line 9, to a leaching tank 10. Water and recirculated leaching liquid are supplied to the tank 10 through a line 11 and a line 12 respectively. Subsequent to leaching the sulphatized material in the tank 10, the leaching residue is passed, via a line 13, to a chlorinating process 14 for example, in which process the residual metal values are chlorinated and recovered in a known manner, in the form of metal chlorides, as indicated by the arrow 15, and in the form of iron oxide as indicated by the arrow 16. The chlorinating process 14 can alternatively be replaced by a leaching step, where the leaching residue is leached with a leaching solution containing chlorine or a cyanide.

Hydrochloric acid is charged to the chlorinating process through a line 17. The leached product can suitably be agglomerated (not shown) prior to transferring the same to the chlorinating process, via the line 13. The leaching liquid is passed via a line 18 from the leaching tank 10 to an electrolysis tank 19, in which copper is recovered electrolytically and is removed from the tank as indicated by the arrow 20. The regenerated leaching liquid is removed through a line 21, part of said liquid being returned to the leaching step via lines 22 and 12, and part of said liquid being passed to the roasting furnace 1 via lines 22, 24, 26 and 27. Before the leaching solution is returned to the roasting furnace 1, it is passed into an evaporator 25 via a line 26, and is passed in a more concentrated form from the evaporator 25 to the furnace 1 via a line 27. The evaporator 25 may conveniently comprise a so-called Gaillard-tower, which is an inbricked tower lacking packing bodies and in which the leaching solution is in direct heat exchange with roaster gases from the furnace 1, these gases being fed to the evaporator through a line 28 and discharged from the evaporator through a line 29. It may also be suitable to provide a pre-evaporator 30 to which leaching solution is passed via the line 24 and from which a more concentrated leaching solution is discharged via the line 26. The leaching solution is heated indirectly in the pre-evaporator 30, steam being supplied to the evaporator via a line 31 and removed therefrom via a line 32.

The roaster gases which are taken from the roasting furnace 1 and passed via line 28 to the evaporator 25 are conveyed through the line 29 to a cooling tower 33, from which the gas is passed to a sulphuric acid plant 35 through a line 34, sulphuric acid being removed from the plant 35 through the line 7 and passed to the second roasting step 5 and, via a line 36, to a possible secondary use. Condensed water from the gas cooled in the cooling tower 33 is passed from the tower to the leaching tank 10 via the line 11. When further water is required, this is introduced through the line 23.

To prevent enrichment of metal salts in the leaching solution, a portion of the solution must be withdrawn from the system, as indicated with the line 37, and be transferred to a de-coppering step 38, the outtake of copper from which is indicated by the arrow 39 and from which electrolyte is removed via a line 40. This de-coppered electrolyte is then subjected to further treatment, depending upon which metals have been enriched in the leaching solution. Thus, nickel sulphate can be precipitated by evaporation and recovered and the residual solution may, for example, be transferred to the chlorinating process 14 or to some other suitable process. The roasting furnace 1 conveniently comprises a fluidized-bed furnace provided with the normal peripheral equipment, such as waste heat boiler, arsenic removal stages, mercury removal stages and the like.

EXAMPLE 1

In a plant such as the shown in the Figure there was worked up a copper concentrate having substantially the following composition (by weight): Cu 28.0%, Fe 29.4%, S 33.8% and the remaining 8.8% comprising Ni, Co, Zn, Sn, Pb, Precious metals, Si, Ca, O and minor quantities of other elements.

To the roasting furnace there were charged 15 t/h concentrates, 20,200 Nm$^3$/h air and 4,900 Nm$^3$/h exit gas from the sulphatizing steps, the roasting process was effected at a temperature of 900° C, the iron content of the roasted product substantially being in the form of magnetite. For destruction purposes there were also charged to the furnace 7.5 t/h concentrated electrolyte from the electrolysis step, said electrolyte containing 7.3% by weight copper and 54.7% by weight sulphuric acid. 29,200 Nm$^3$/h gas having approximately 21% by volume $SO_2$, and 12.75 t/h roasted product containing 37.0% by weight copper and 37.8% by weight iron (53.6% by weight $Fe_3O_4$) were obtained from the roasting furnace.

Subsequent to cooling the roasting gas and condensing out any water present, the gas was passed to the sulphuric acid plant, which formed an integral part of the process. Air and 0.7 m$^3$/h water were added, whereupon 21.6% t/h concentrated sulphuric acid was obtained (97% yield).

The roasted product was sulphatized at 700° C whilst supplying 3,200 Nm$^3$/h air and 8.3 tons of 97% by weight sulphuric acid from the sulphuric acid plant. The exit sulphatizing gas was passed to the roaster step, as above indicated. The sulphatizing of copper was controlled in a manner such as only copper sulphate was formed.

19.3 tons of sulphatized materials were removed hourly and were found to contain 61.9% by weight copper sulphate and 24.9% by weight iron in oxide form. These materials were leached whilst 56.7 m$^3$/h of return electrolyte and 50.4 m$^3$/h of water were added, of which water 32.6 m$^3$/h was recovered at condensating by cooling the roaster gases obtained from the roasting furnace. From the leaching step there were removed 7.9 t/h of leaching residue containing 2.7% by weight copper and approximately 96% by weight iron oxide, which iron oxide, subsequently to being pelletized, was purified from non-ferrous metals by a chlorinating volatilization process with the addition of 0.2 t/h hydrochloric acid and a heat supply of approximately 8.8 gigajoule per hour (GJ/h), wherein there were obtained 7.6 t/h purified iron oxide pellets, and inter alia, 0.21 t/h copper in the form of chloride. Approximately 90% of ingoing silver and other precious metals could also be recovered in the form of chlorides.

The leaching liquid from the leaching step was passed to the electrolysis step, wherewith 3.78 t/h electrolytic copper were recovered.

The residual solution contained 20 g/l copper and 150 g/l sulphuric acid and constituted a quantity of 94.5 m$^3$/h, of which quantity 27.3 m$^3$/h were returned to the roasting furnace subsequent to being subjected to an evaporation process in two stages, whereupon a total of 20.7 t/h water were removed. An additional supply of heat in the region of 18 GJ/h was required prior to the evaporation step.

56.7 m$^3$/h of the residual solution was removed for leaching the sulphatized roaster product, and the remaining 10.5 m$^3$/h were passed to a separate pyrite roasting furnace subsequent to being subjected to an electrolytic de-coppering process, in which 0.21 t/h of copper were recovered, said residual solution being destroyed and the sulphur converted to sulphur dioxide in the roasting gas, from which approximately 1 t/h of concentrated sulphuric acid originating from sulphur in the residual solution could be recovered. These latter process steps are not shown in the drawing.

Thus, of ingoing 4.20 tons of copper to the process each hour, 3.78 tons copper were recovered as electrolytic copper, 0.21 tons were recovered by decoppering drawn-off electrolyte, and 0.21 tons were recovered in the form of copper chloride by chlorinating leaching residues.

Of ingoing 5.08 tons sulphur to the process each hour, 4.41 tons sulphur were recovered in the form of sulphuric acid, 0.62 tons were recovered by decoppering the electrolyte and were destroyed in a separate roasting furnace and then converted to sulphuric acid, while the remaining 0.05 tons were lost in the waste gases from the sulphuric acid plant.

EXAMPLE 2

Copper concentrates having the same composition as the concentrates referred to in FIG. 1 were worked-up in the plant of Example 1. The sulphatizing of copper was controlled in a manner such that only the basic sulphate $CuO \cdot CuSO_4$ was formed. During the roasting operation, 2200 Nm³/h of air and 4,000 Nm³/h of gas from the sulphatizing step, together with 6.3 t/h electrolyte concentrated be evaporation with 2.3% by weight copper were charged to the furnace and there was obtained 31,600 Nm³/h of gas which, subsequent to having been used in the Gaillard-tower for expelling 1.5 t/h water from the return electrolyte and being dried, contained 17.5% by volume $SO_2$ upon its introduction into the sulphuric acid plant.

The sulphatizing step was effected whilst supplying the same quantity of air as that recited in Example 1, although with only 4.7 t/h sulphuric acid, there being obtained 15.6 t/h sulphatized materials with 27.7% copper corresponding to 51.9% basic copper sulphate, and 43.8% $Fe_3O_4$ calculated by weight.

Leaching was effected under the same conditions as those recited in Example 1, but with the addition of 76.9 m³/h return electrolyte and 15 m³/h water, of which 3.7 m³/h were condensed out from the roaster gas.

The electrolysis was effected in the same manner as that recited in Example 1, with the same input and output quantities, as was also the decoppering of the extracted electrolyte.

As beforementioned, 76.9 m³/h of the obtained residual electrolyte were passed to the leaching step, whilst only 7.1 m³/h were returned to the roasting step for evaporation and destruction.

With regard to copper and sulphur, the same material balance was obtained as that in Example 1. As opposed to Example 1, however, there was no need to supply additional heat in the form of steam, obtained in the pre-evaporation step, to the process, this being rendered unnecessary when the copper material in question is sulphatized during the formation of basic copper sulphate. In the illustrated example, the process even provides a heat surplus of 27 GJ/h, which must be dissipated.

We claim:

1. In a method for recovering copper and/or other non-ferrous metals including precious metals, from iron-containing sulphidic raw material comprising copper and/or other non-ferrous metals, wherein the starting material is first subjected to a sulphatizing treatment so as to convert at least one of the non-ferrous metals into the form of a readily soluble sulphate and/or basic sulphate, whereafter said at least one non-ferrous metal in a leaching stage is leached out with an aqueous sulphuric acid solution, the major quantity of the leached metal or metals then being recovered from the leaching solution formed and wherein remaining non-ferrous metals in the leaching residue formed is optionally recovered by further process stages, the improvement which comprises carrying out the sulphatizing treatment process in two stages, the material being in a first stage roasted in a roasting furnace to a substantially sulphur-free state and then in a second stage the roasted material being treated in a separate reaction chamber by supplying sulphatizing agent thereto, the second stage treatment being effected under such conditions as to permit substantial forming of compounds comprising sulphates, basic sulphates or mixtures thereof of said at least one non-ferrous metal, feeding a first portion of the residual solution obtained subsequent to recovering non-ferrous metal content from the leaching solution to the leaching stage, the magnitude of said first portion being selected to effect said leaching and returning a second portion of said residual solution to the roasting furnace, where the sulphur content of said second portion of the solution is converted into sulphur dioxide and passed to the gases formed by the roasting.

2. A method according to claim 1, wherein the roasting in the first stage is carried out at a temperature of between 800 and 1100° C whilst supplying a gas containing free oxygen in a manner such that the partial pressure of oxygen in the resulting roaster gas lies beneath a curve which is formed in a diagram where $\log_{10} p_{O_2}$ is plotted on the ordinate and where $p$ is expressed in atmospheres and the temperature is plotted on the abscissa in °C, said curve passing the associated values:

| $\log_{10} p_{O_2}$ | Temp. ° C |
| --- | --- |
| −6.6 | 800 |
| −4.5 | 900 |
| −3.0 | 1000 |
| −2.3 | 1050 |

3. A method according to claim 2, wherein the partial pressure of oxygen in the resulting roaster gas is set so that the pressure lies beneath a curve in said diagram which passes through the points:

| $\log_{10} p_{O_2}$ | Temp. ° C |
| --- | --- |
| −9.5 | 800 |
| −7.5 | 900 |
| −5.8 | 1000 |
| −5.0 | 1050 |

4. A method according to claim 1, wherein the sulphatizing treatment is effected so that the treated product contains said at least one non-ferrous metal in the form of a sulphate, a basic sulphate or mixtures thereof.

5. A method according to claim 4, wherein said treated product also contains said at least one non-ferrous metal in the form of an oxide.

6. A method according to claim 1, wherein the sulphatizing agent supplied comprises at least one of the agents in the group consisting of sulphuric acid, sulphur dioxide and air, or sulphur trioxide.

7. A method according to claim 1, wherein the residual solution is passed to a separate evaporator in direct connection with the roasting furnace.

8. A method according to claim 1, wherein the residual solution is pre-evaporated before it is passed to the roasting furnace.

9. A method according to claim 7, wherein the residual solution is pre-evaporated before it is passed to the evaporator connected with the roasting furnace.

10. A method according to claim 1, wherein part of the residual solution is drawn-off enriched by evaporation and optionally nickel sulphate is separated therefrom before the enriched residual solution is passed to the roasting furnace.

11. A method according to claim 1, wherein a third portion of the residual solution is drawn-off and passed to a roasting furnace located externally of the system.

12. A method according to claim 11, wherein the major portion of the metal content of said drawn-off third portion of the residual solution is recovered prior to the residual solution being passed to the roasting furnace.

13. A method according to claim 1, wherein the non-ferrous metal content of the leaching solution is recovered by a reduction of said metal content in the leaching solution.

14. A method according to claim 13, wherein the reduction is effected by electrolysis.

15. A method according to claim 1, wherein the leaching solution is purified from any non-desirable metals, such as iron, prior to passing the solution to the recovery stage.

16. A method according to claim 15, wherein said purification of the leaching solution is carried out by means of a liquid-liquid extraction.

17. A method according to claim 1, wherein remaining non-ferrous metals in the leaching residue are recovered by a chlorinating treatment.

18. A method according to claim 1, wherein remaining non-ferrous metals in the leaching residue are recovered by leaching said residue with a solution containing chlorine or cyanide.

19. A method according to claim 1, wherein iron containing sulphidic raw materials is treated, characterized in that the sulphatizing treatment in the second step is effected under such conditions where iron sulphate does not exist.

* * * * *